(12) United States Patent
Chang et al.

(10) Patent No.: US 8,510,525 B2
(45) Date of Patent: Aug. 13, 2013

(54) METHOD OF DUPLICATING SEGMENTED DATA TO MULTIPLE RANDOM ACCESSIBLE STORAGE DEVICES

(75) Inventors: Shuo-Wei Chang, Alhambra, CA (US); Liao-Hsuan Kuo, Alhambra, CA (US)

(73) Assignee: Vinpower Inc., Alhambra, CA (US)

( * ) Notice: Subject to any disclaimer, the term of this patent is extended or adjusted under 35 U.S.C. 154(b) by 394 days.

(21) Appl. No.: 12/592,089

(22) Filed: Nov. 19, 2009

(65) Prior Publication Data
US 2011/0119428 A1    May 19, 2011

(51) Int. Cl.
*G06F 13/00* (2006.01)

(52) U.S. Cl.
USPC ........... 711/162; 711/161; 711/115; 711/103; 714/4.11; 369/53.22

(58) Field of Classification Search
USPC ............... 369/47.15, 53.11, 53.22; 711/103, 711/162, 161, 115; 714/4.11
See application file for complete search history.

(56) References Cited

U.S. PATENT DOCUMENTS

| | | | | |
|---|---|---|---|---|
| 5,146,369 A | * | 9/1992 | Yamaguchi | 360/15 |
| 5,247,618 A | * | 9/1993 | Davis et al. | 710/21 |
| 5,796,684 A | * | 8/1998 | Yaegashi | 709/230 |
| 6,292,852 B1 | * | 9/2001 | Bodo et al. | 710/20 |
| 2003/0070043 A1 | * | 4/2003 | Merkey | 711/114 |
| 2004/0022139 A1 | * | 2/2004 | Miller | 369/30.19 |
| 2005/0192820 A1 | * | 9/2005 | Simon et al. | 705/1 |
| 2006/0020745 A1 | * | 1/2006 | Conley et al. | 711/103 |
| 2008/0065904 A1 | * | 3/2008 | Clark | 713/193 |

FOREIGN PATENT DOCUMENTS
TW    233054    10/1994
TW    200627158    8/2006

OTHER PUBLICATIONS
SuperFlex 3000 with DGR, Storage Dimensions, Nov. 1996, pp. 1-4.*

* cited by examiner

*Primary Examiner* — Hong Kim
(74) *Attorney, Agent, or Firm* — William E. Pelton, Esq.; Cooper & Dunham LLP

(57) ABSTRACT

A method of duplicating data to multiple random accessible storage devices has steps of reading one segment of source data having multiple segments, continuously detecting newly-connected random accessible storage devices, duplicating same segments to all connected random accessible storage devices, stopping duplicating the source data to any random accessible storage device that has stored all segments of the source data and repeating the steps from the beginning. When duplicating the source data to all connected random accessible storage devices, same segments of the source data are written to all connected random accessible storage devices. Therefore, a single writing task is proceeded in each writing session. The source data can be written to all random accessible storage devices at high speed. Consequently, efficiency of asynchronously duplicating data to multiple random accessible storage devices is increased.

6 Claims, 7 Drawing Sheets

METHOD OF DUPLICATING SEGMENTED DATA TO MULTIPLE RANDOM ACCESSIBLE STORAGE DEVICES

BACKGROUND OF THE INVENTION

1. Field of the Invention

The present invention relates to a method, and more particularly to a method of duplicating data to multiple random accessible storage devices.

2. Description of Related Art

Random accessible storage devices comprise flash memory storage devices. Universal Serial Bus (USB) flash drives, so-called Pen Drives or USB sticks, are widely used and popular commodities in today's society because it is rewritable and offers high volume to storage capacity ratio so it can be carried conveniently. Therefore, USB flash drives may be used as promotional gifts storing data, such as company information, merchandise catalogs or the like. However, if a large amount of USB flash drives with data is required, using a personal computer (PC) to copy data to many USB flash drives is an inefficient use of time.

A conventional USB flash drive duplicator is used to duplicate a large amount of USB flash drives and may be a synchronous duplicator or an asynchronous duplicator. Each duplicator has multiple USB connectors and a buffer. The USB connectors are used to connect respectively to target USB flash drives. The buffer is controlled to read the source data from a source medium and write the source data to the target USB flash drives through the USB connectors. In general, because the buffer has lower storage capacity than the source data, the source data is read and written in segments. Once a read segment of source data in the buffer has been written to the target USB flash drives, the USB flash drive duplicator will read the next segment of source data and overwrite the read segment in the buffer.

The synchronous duplicator requires all target USB flash drives to be plugged into the USB connectors on the duplicator before starting duplication and then the duplicator copies the source data from the first segment to the last segment in sequence to all target USB flash drives simultaneously. However, when copying data to large amounts of target USB flash drives, unplugging written target USB flash drives and plugging in unwritten target USB flash drives before starting duplication is time inefficient.

The asynchronous duplicator allows duplication to begin once a single target USB flash drive has been plugged in. Then, the asynchronous duplicator would duplicate the source data to subsequent target USB flash drives once connected and detected. A first conventional duplication method applied to the asynchronous duplicator is to divide the buffer into multiple sectors corresponding respectively to the USB connectors. Each sector of the divided buffer reads and writes the source data to a corresponding target USB flash drive to allow asynchronous duplication. However, the limited buffer needs to be divided into many sectors to handle asynchronous duplication with the first duplication method. As more target USB flash drives are connected asynchronously, more sectors of the buffer are required so asynchronous duplication is less efficient and considerably slower.

To solve the shortcomings of the first duplication method for asynchronous duplication, a second duplication method is taught, which requires the source data capacity to be equal to or smaller than the storage capacity of the buffer. The buffer finishes reading the whole source data before writing the source data to the target USB flash drives. When the target USB flash drives are asynchronously plugged into the USB connectors, the buffer proceeds to write the source data to the connected target USB flash drive without reading the source data. Therefore, the buffer operates at higher efficiency; however, raising a storage capacity of the buffer raises costs proportionately. Further, the second duplication method is limited to source data equal to or smaller than the storage capacity of the buffer. Therefore, use of duplicators applying the second duplication method are limited to source data smaller than the storage capacity of the buffer so that the use is limited. Further, as data storage becomes cheaper and data capacity of USB flash drives increases proportionately to cost, duplicators applying the second duplication method become obsolete and require replacement.

To overcome the shortcomings, the present invention provides a method of duplicating data to multiple random accessible storage devices to mitigate or obviate the aforementioned problems.

SUMMARY OF THE INVENTION

The main objective of the invention is to provide a method of duplicating data to multiple random accessible storage devices.

The method in accordance with the present invention comprises steps of reading one segment of source data comprised of multiple segments, continuously detecting newly-connected random accessible storage devices, duplicating same segments to all connected random accessible storage devices, stopping duplicating the source data to any random accessible storage device that has stored all segments of the source data and repeating the steps from the beginning. When duplicating the source data to all connected random accessible storage devices, same segments of the source data are written to all connected random accessible storage devices. The method of the present invention will keep reading the source data segmentally and write the same segment of the source data to all unfinished random accessible storage devices in cycles. Since each random accessible storage device is detected non-simultaneously, each random accessible storage device might start duplication from different segments of the source data, and will stop duplication once they complete all segments from the source data.

The method includes reading and writing the same segment of the source data to all connected random accessible storage devices. The buffer does not need to be divided and will work more efficiently. Therefore, the source data can be read and written to all random accessible storage devices at high speed. Consequently, efficiency of asynchronously duplicating data to multiple random accessible storage devices is increased.

Other objectives, advantages and novel features of the invention will become more apparent from the following detailed description when taken in conjunction with the accompanying drawings.

DETAILED DESCRIPTION OF PREFERRED EMBODIMENT

Figure 1:
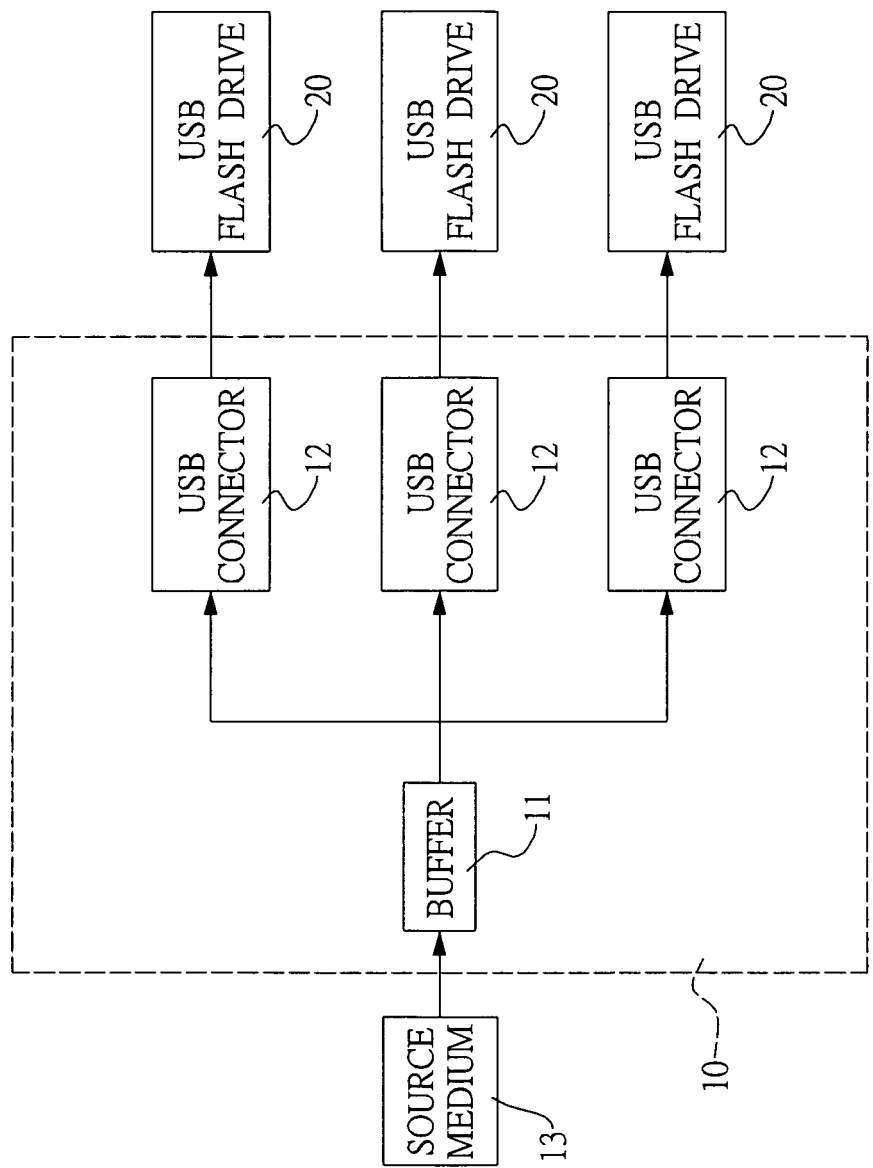
FIG. 1 is a functional block diagram of a Universal Serial Bus (USB) flash drive duplicator to which a method in accordance with the present invention is applied.

A method of duplicating data to multiple random accessible storage devices in accordance with the present invention may be used to duplicate data to any type of random accessible storage devices. For example, hard disk drives, Universal Serial Bus (USB) flash drives, Secure Digital (SD) flash memory cards and Micro SD flash memory cards are common random accessible storage devices. With reference to FIG. 1, the method of the present invention may be applied to a USB flash drive duplicator (10), and the random accessible storage devices may be USB flash drives (20). The USB flash drive duplicator (10) allows connecting the USB flash drives (20) to the USB flash drive duplicator (10) non-simultaneously and comprises a buffer (11) and multiple USB connectors (12). The buffer (11) is connected to a source medium (13) and is controlled to segmentally retrieve source data from the source medium (13). The storage capacity of the buffer (11) is independent of the data capacity of the source data. To exemplify the invention, hereinafter the storage capacity of the buffer (11) is described as less than the data capacity of the source data, but no limitation should be construed. The USB connectors (12) are used to connect respectively to the USB flash drives (20). To exemplify the invention, hereinafter three USB connectors (12) are implemented, but no limitation should be construed.

Figure 2:
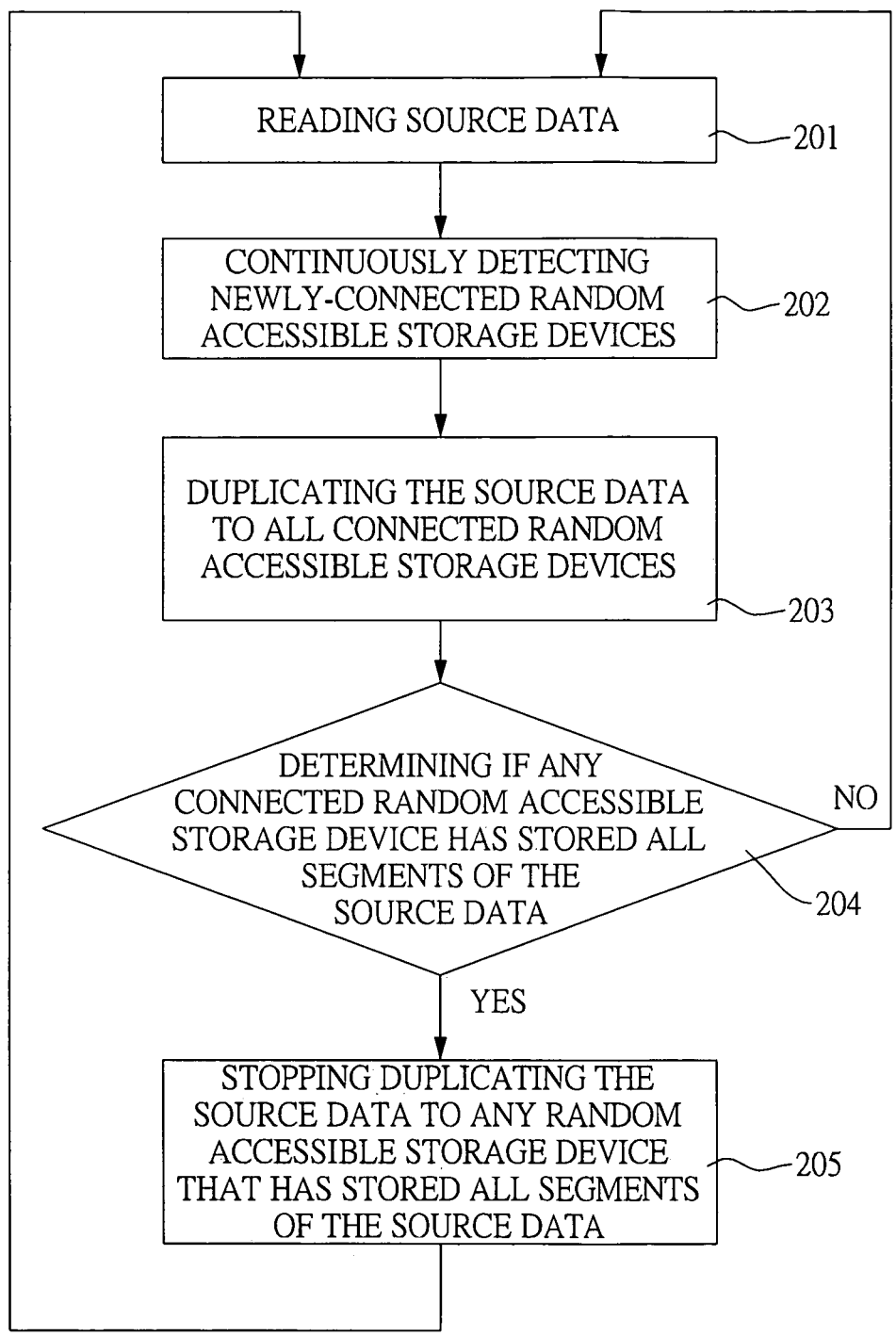
FIG. 2 is a flow chart of the method in accordance with the present invention.

With reference to FIG. 2, the method of the present invention comprises steps of reading source data (201), continuously detecting newly-connected random accessible storage devices (202), duplicating the source data to all connected random accessible storage devices (203), determining if any connected random accessible storage device has stored all segments of the source data (204) and stopping duplicating the source data to any random accessible storage device that has stored all segments of the source data (205).

In the step of reading source data (201), the USB flash drive duplicator (10) divides the source data into multiple segments so the buffer (11) reads the source data segmentally from the source medium (13), that is, one segment of the source data is read in each reading session. To exemplify the invention, the USB flash drive duplicator (10) divides the source data into segment S1, S2 and S3. The buffer (11) reads a single segment of the source data in each reading session, and the buffer (11) may read the segments of the source data sequentially or non-sequentially. To exemplify the invention, the buffer (11) reads the source data sequentially. It means reading the segments S1, S2 and S3 in sequence.

In the step of continuously detecting newly-connected random accessible storage device (202), the USB flash drive duplicator (10) continuously monitors whether any USB flash drive (20) is plugged into the USB connectors (12) so the USB flash drives (20) may be plugged into the USB connectors (12) during operation of the USB flash drive duplicator (10).

In the step of duplicating the source data to all connected random accessible storage devices (203), the buffer (11) is controlled to write the same segment of the source data as read by the buffer (11) to all connected USB flash drives (20) in each writing session. The USB flash drive duplicator (10) further records a first segment and a last segment of the source data for each USB flash drive (20). Each first segment of the source data is the first segment that is written to a corresponding USB flash drive (20). Each last segment of the source data is the last segment that is written to a corresponding USB flash drive (20).

In the subsequent step of determining if any connected random accessible storage device has stored all segments of the source data (204), the USB flash drive duplicator (10) determines whether the last segment of any connected random accessible storage device has been written therein. If the last segment of any connected random accessible storage device has been written therein, the random accessible storage device has stored all segments of the source data. Otherwise, the steps of reading, detecting and duplicating (201, 202, 203) are repeated.

If any connected random accessible storage device has stored all segments of the source data, the step of stopping duplicating source data to any random accessible storage device that has stored all segments of the source data (205) is subsequently proceeded. The USB flash drive duplicator (10) stops duplicating the source data to any USB flash drive (20) that has finished duplicating the source data and such USB flash drive (20) can be unplugged and replaced. Subsequently, the steps of reading, detecting, duplicating and determining (201, 202, 203, 204) are repeated because some USB flash drives (20) may still not finish duplicating the source data.

Figure 3:
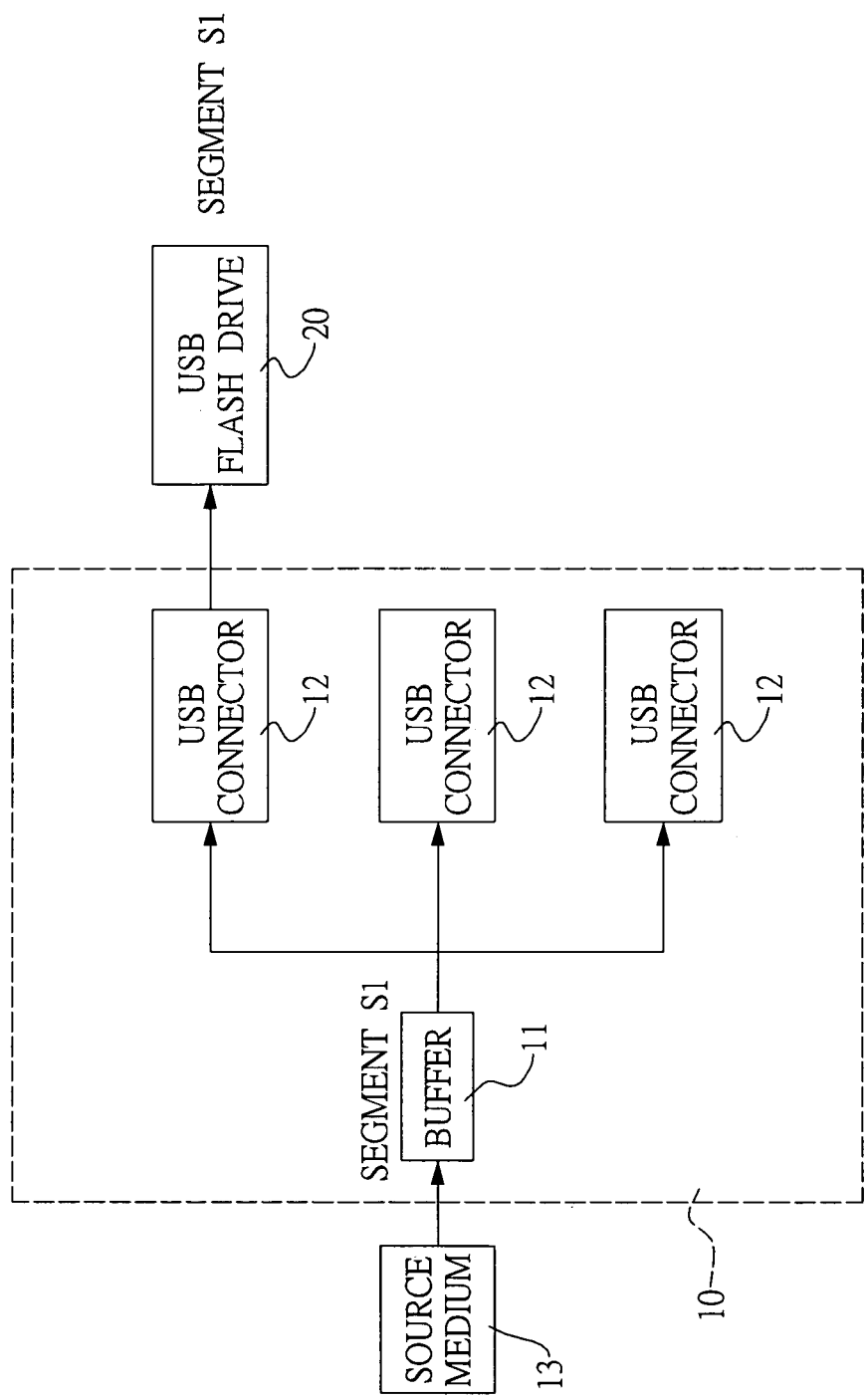
FIGS. 3 to 7 are sequential functional block diagrams of the USB flash drive duplicator, showing an embodiment of the method in accordance with the present invention.

For example, with reference to FIG. 3, when a first USB flash drive (20) is plugged into one of the USB connectors (12) and the segment S1 of the source data has been read to the buffer (11), the USB flash drive duplicator (10) writes the segment S1 of the source data to the connected first USB flash drive (20) in a first writing session. Further, the USB flash drive duplicator (10) also records that the first segment and the last segment of the source data for the first USB flash drive (20) are the segment S1 and the segment S3 of the source data. When the buffer (11) has finished writing the segment S1 of the source data to the first USB flash drive (20), the USB flash memory duplicator (10) subsequently reads the segment S2 of the source data from the source medium (13) to the buffer (11) and overwrites the segment S1 in the buffer (11).

Figure 4:
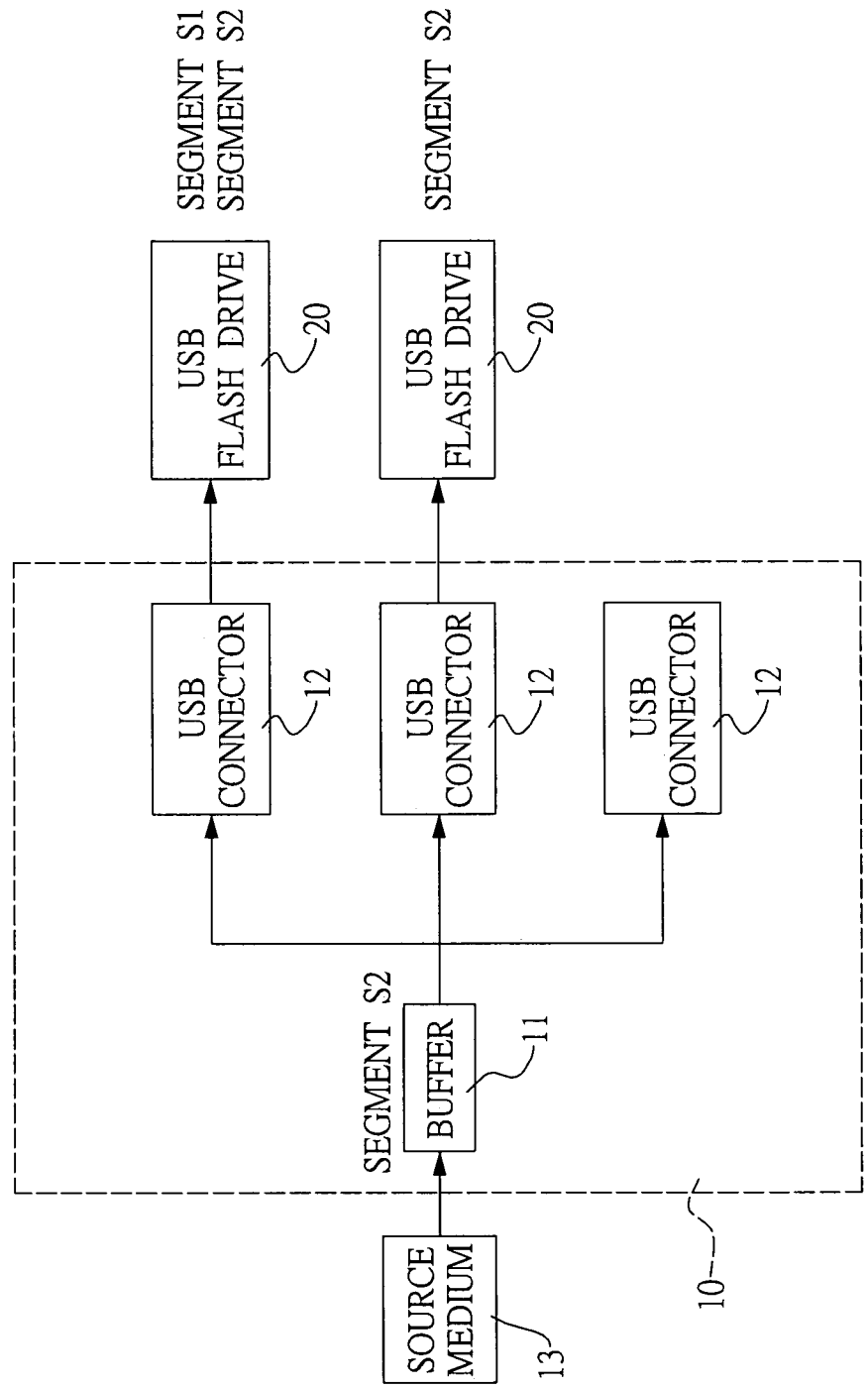

With further reference to FIG. 4, when a second USB flash drive (20) is plugged into another USB connector (12), the USB flash drive duplicator (10) duplicates the segment of the source data existing in the buffer (11), that is the segment S2 in this embodiment, to the connected first and second USB flash drives (20) in a second writing session. The USB flash drive duplicator (10) also records that the first segment and the last segment of the source data for the second USB flash drive (20) are the segment S2 and the segment S1 of the source data. When the buffer (11) has finished writing the segment S2 of the source data to the first and the second USB flash drives (20), the USB flash memory duplicator (10) reads the segment S3 of the source data from the source medium (13) to the buffer (11) and overwrites the segment S2 in the buffer (11).

Figure 5:
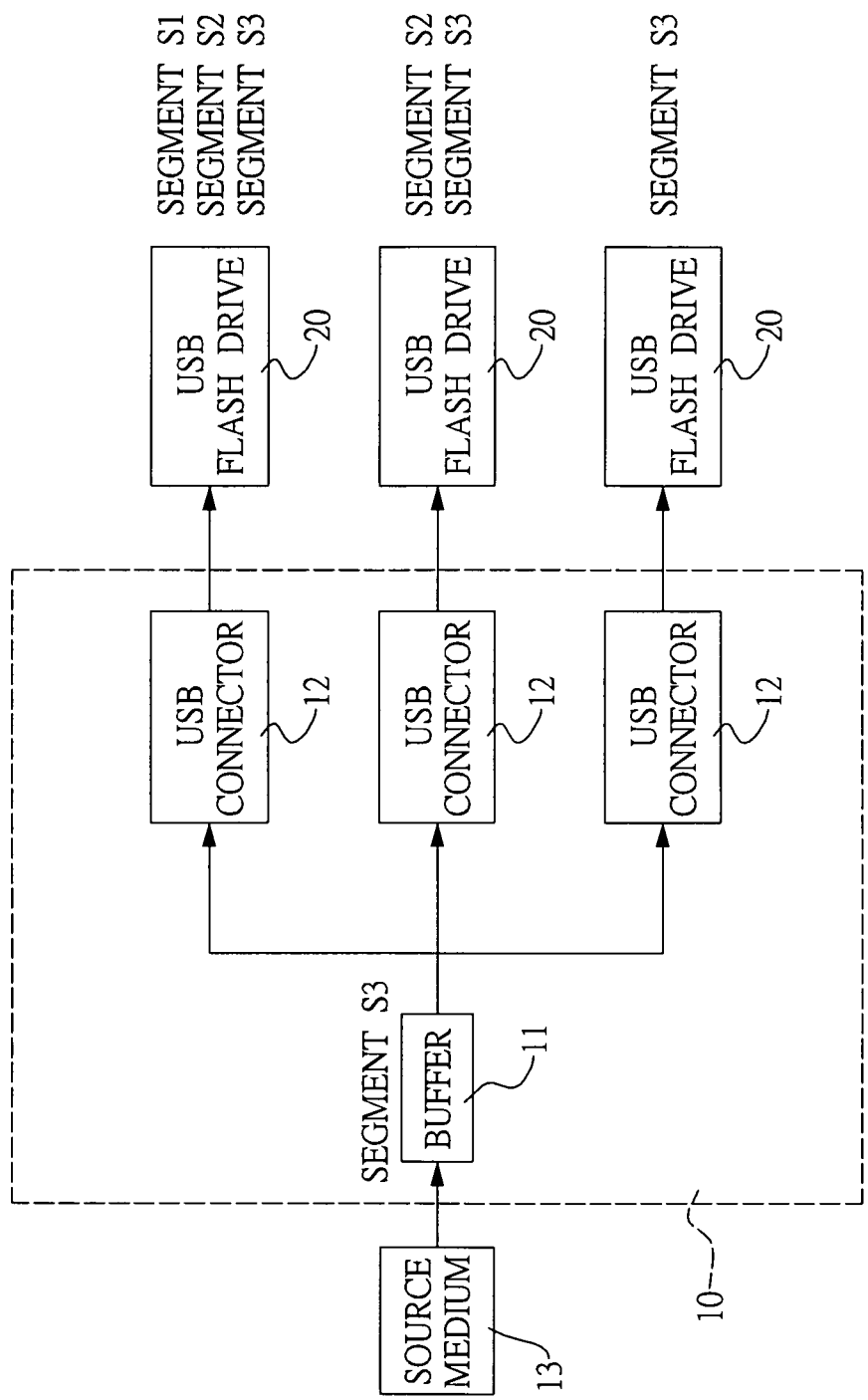
Figure 6:
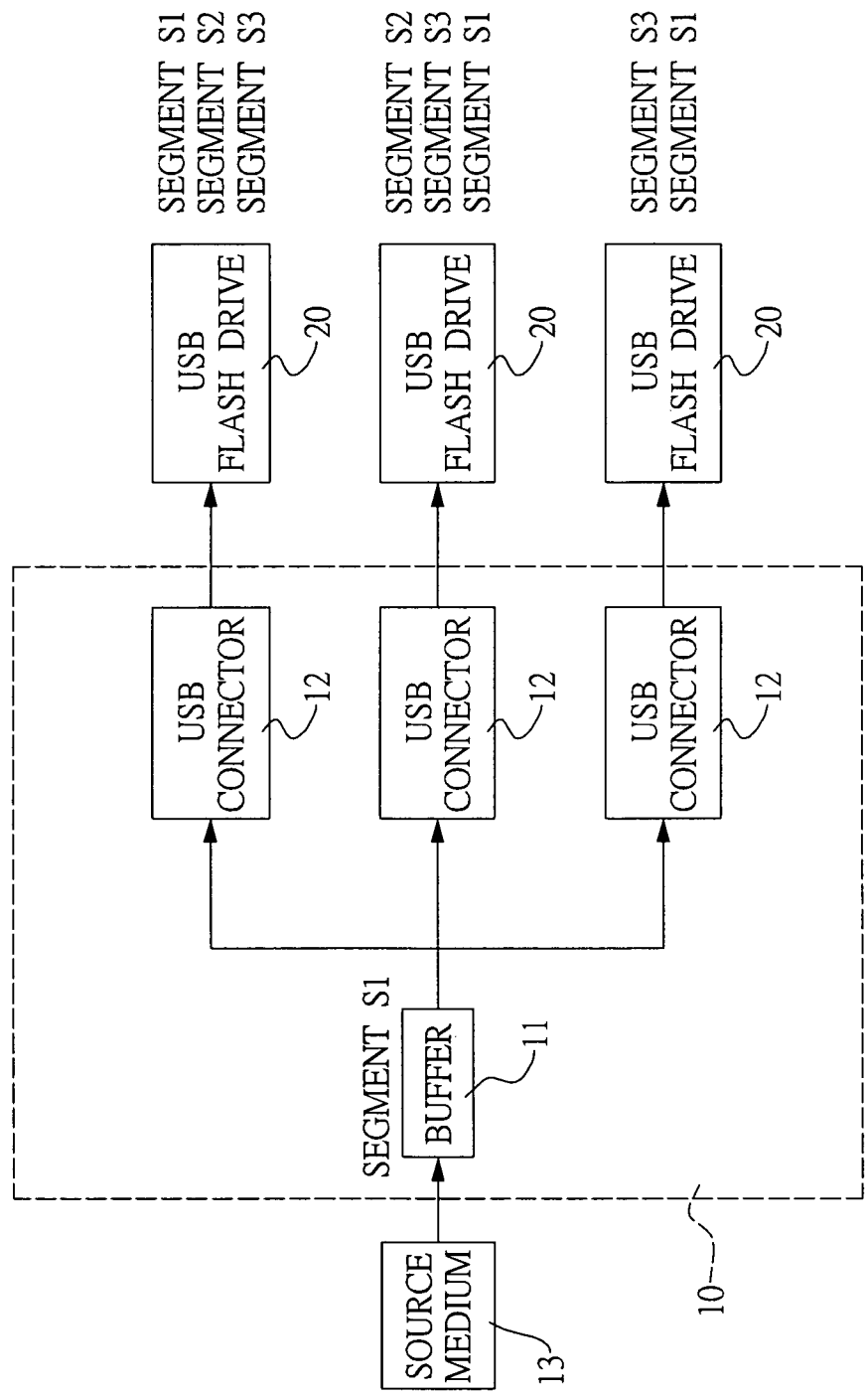
Figure 7:
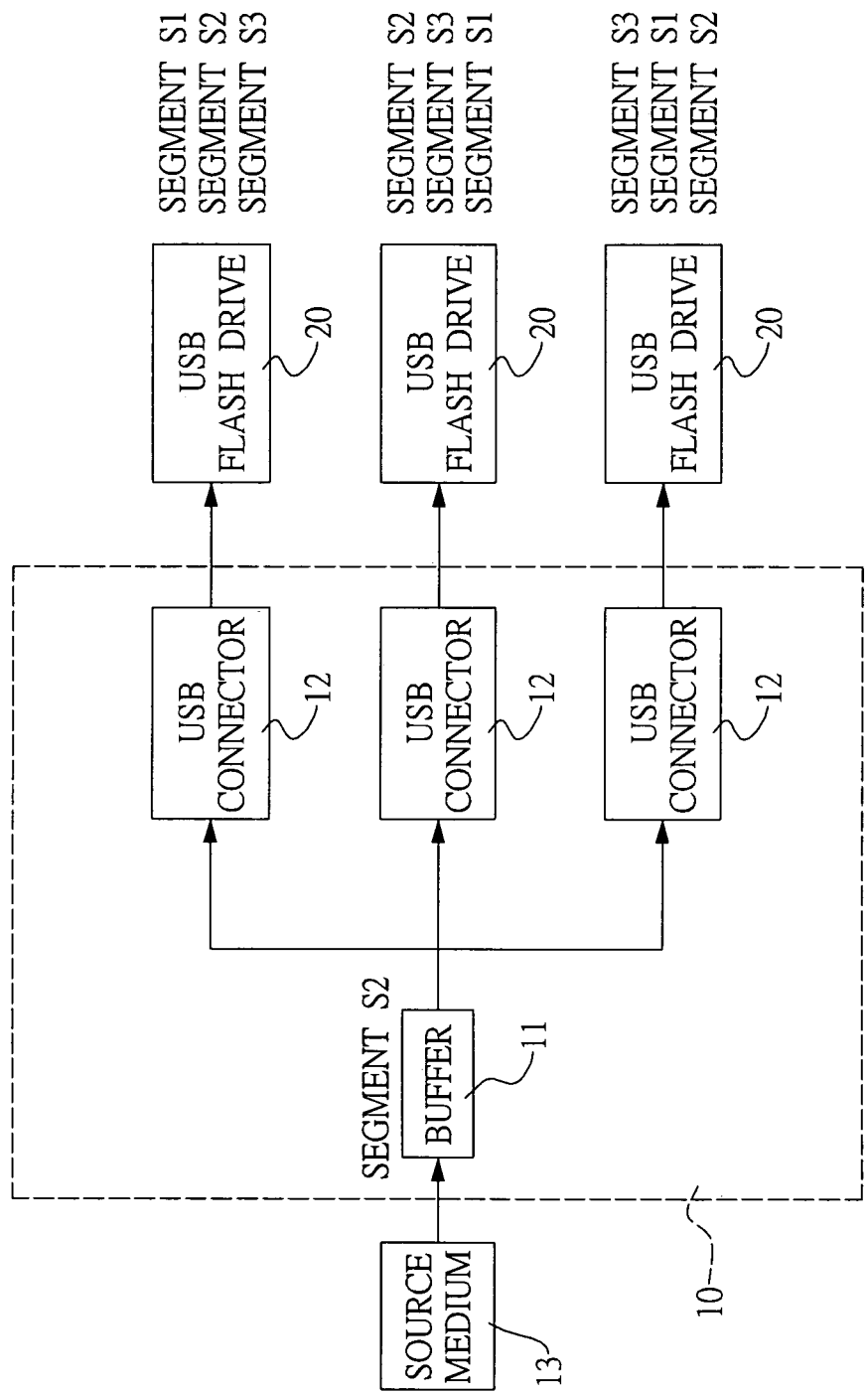

With further reference to FIG. 5, when a third USB flash drive (20) is plugged into the other USB connector (12), the USB flash drive duplicator (10) duplicates the segment of the source data existing in the buffer (11), that is the segment S3 in this embodiment, to the connected first, second and third USB flash drives (20) in a third writing session. The USB flash drive duplicator (10) also records that the first segment and the last segment of the source data for the third USB flash drive (20) are the segment S3 and the segment S2 of the source data. When the buffer (11) has finished writing the segment S3 of the source data to the first, second and third USB flash drives (20), the USB flash memory duplicator (10) reads the segments S1 from source medium (13) to the buffer (11) and overwrites the segment S3 on the buffer (11). With further reference to FIGS. 6 and 7, the USB flash memory duplicator (10) subsequently returns to read the segment S1 of the source data from the source medium (13) to the buffer (11). The buffer (11) repetitively reads the segments of the source data from the source medium (13).

When the USB flash drive duplicator (10) determines that the first USB flash drive (20) has stored the last segment, that is segment S3, of the source data, the USB flash drive duplicator (10) stops duplicating the source data to the first USB flash drive (20). The USB flash drive duplicator (10) will keep reading the source date from the source medium (13) and duplicating the second and the third USB flash drives (20), which have incomplete segments S1, S2, and S3 from the source medium (13). When the USB flash drive duplicator (10) determines that the second USB flash drive (20) has stored the last segment, that is segment S1, of the source data, the USB flash drive duplicator (10) stops duplicating the source data to the second USB flash drive (20). When the USB flash drive duplicator (10) determines that the third USB flash drive (20) has stored the last segment, that is segment S2, the USB flash drive duplicator (10) stops duplicating the source data to the third USB flash drive (20). The reading and writing process in the duplicator will keep looping to duplicate the source data to connected USB flash drives (20), which have stored all segments of the source data incompletely.

Such a method uses a feature of random accessible storage devices that allows writing the source data to the random accessible storage devices sequentially and non-sequentially. Even the USB flash drives (20) are plugged into the USB connectors (12) non-simultaneously, the buffer (11) is controlled to duplicate the same segment of the source data to all connected USB flash drives (20) in each writing session in cycles. Therefore, with the method of the present invention, because the buffer (11) writes the same segment of the source data in each writing session, the buffer (11) only proceeds with a single task in each writing session, which increases efficiency and performance in the buffer (11) and application of the duplicator (10) compared to conventional duplication methods.

Even though numerous characteristics and advantages of the present invention have been set forth in the foregoing description, together with details of the structure and function of the invention, the disclosure is illustrative only. Changes may be made in detail, especially in matters of arrangement of parts within the principles of the invention to the full extent indicated by the broad general meaning of the terms in which the appended claims are expressed.

What is claimed is:

1. A method of duplicating segmented data to multiple random accessible storage devices, comprising the steps of:
   reading one segment of the source data comprising multiple segments;
   continuously detecting newly-connected random accessible storage devices;
   duplicating same segments to all connected random accessible storage devices;
   recording a first segment and a last segment of the source data for each connected random accessible storage device, and each first segment of the source data being the first segment that is written to a corresponding connected random accessible storage device, and each last segment of the source data being the last segment that is written to a corresponding connected random accessible storage device;
   determining if any connected random accessible storage device has stored all segments of the source data comprising determining whether the last segment of any connected random accessible storage device has been written therein;
   stopping duplicating the source data to any random accessible storage device that has stored all segments of the source data; and
   repeating the steps from the beginning.

2. The method as claimed in claim 1, wherein if any connected random accessible storage device has not stored all segments of the source data, the steps are repeated from the beginning.

3. The method as claimed in claim 2, wherein the step of reading one segment of the source data further comprises reading the segments of the source data sequentially.

4. The method as claimed in claim 2, wherein the step of reading one segment of the source data further comprises reading the segments of the source data non-sequentially and repetitively.

5. The method as claimed in claim 1, wherein the step of reading one segment of the source data further comprises reading the segments of the source data sequentially.

6. The method as claimed in claim 1, wherein the step of reading one segment of the source data further comprises reading the segments of the source data non-sequentially and repetitively.

* * * * *